US000001987H

(19) United States

(12) Statutory Invention Registration (10) Reg. No.: US H1987 H

Brink et al. (43) Published: Aug. 7, 2001

(54) NON-VOLATILE PLASTICIZERS AND FLOW AIDS FOR POLYESTERS

(75) Inventors: Andrew E. Brink, Durham, NC (US); Bruce C. Bell; Gerald T. Keep, both of Kingsport, TN (US)

(73) Assignee: Eastman Chemical Company, Kingsport, TN (US)

(21) Appl. No.: 09/296,333

(22) Filed: Apr. 22, 1999

Related U.S. Application Data

(60) Provisional application No. 60/082,724, filed on Apr. 23, 1998.

(51) Int. Cl.[7] ..... C08J 5/10; C08K 5/09

(52) U.S. Cl. ..... 524/321; 524/366; 524/368

(58) Field of Search ..... 524/128, 366, 524/367, 378, 494, 321

(56) References Cited

U.S. PATENT DOCUMENTS

| | | | |
|---|---|---|---|
| 3,355,413 | 11/1967 | Kiefer . | |
| 3,400,187 | 9/1968 | Farrow . | |
| 4,548,978 | 10/1985 | Garrison . | |
| 5,004,817 | 4/1991 | Bastioli et al. . | |
| 5,451,626 * | 9/1995 | Kumaki et al. | 524/128 |
| 5,624,987 | 4/1997 | Brink et al. . | |

FOREIGN PATENT DOCUMENTS

| | | |
|---|---|---|
| 1217423 | 12/1970 | (GB) . |
| 63-85831 | 10/1989 | (JP) . |

* cited by examiner

*Primary Examiner*—Harold J. Tudor

(74) *Attorney, Agent, or Firm*—Cheryl Tubach; Harry Gwinnell

(57) ABSTRACT

The use of a specified molecular weight range of poly (alkylene ether)s, such as poly(ethylene glycol) (PEG), poly(tetramethylene glycol) (PTMG), and poly(propylene glycol) (PPG), and end-capped poly(alkylene ether)s, as plasticizers for polyesters such as poly(ethylene terephthalate) (PET), poly(propylene terephthalate) (PPT), poly(butylene terephthalate) (PBT), poly(ethylene naphthalate) (PEN), and poly(1,4-cyclohexanedimethylene terephthalate) (PCT), that are non-volatile during drying processes as well as during melt processing. Such poly (alkylene ether)s and end-capped poly(alkylene ether)s decrease the melt viscosity of the polymer matrix and depress the glass transition temperature, and thereby improve the processability of polyesters.

15 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NON-VOLATILE PLASTICIZERS AND FLOW AIDS FOR POLYESTERS

CROSS REFERENCE TO RELATED APPLICATIONS

This application claims priority to provisional application No. 60/082,724, filed Apr. 23, 1998.

FIELD OF THE INVENTION

This invention concerns non-volatile blends of one or more poly(alkylene ether)s or end-capped poly(alkylene ether)s with polyesters that provide faster crystallization rates at lower mold temperatures than polyesters alone.

BACKGROUND OF THE INVENTION

Crystallization rate as a function of temperature is often critical when injection molding semicrystalline engineering thermoplastics. Crystallization rate as a function of temperature controls the optimum mold temperature and cycle time of the process. It is desirable to operate at mold temperatures less than 110° C. because this allows for the use of traditional water heated, as opposed to oil heated, molds. These low mold temperatures also allow the process to operate at an optimum crystallization rate, which in turn translates into shorter cycle times and improved economies.

The use of a plasticizer is well known to the art to enhance crystallization rate. A plasticizer typically decreases the melt viscosity and depresses the glass transition temperature of the thermoplastic, which in turn increases crystallization rate at a lower temperature. Common plasticizers for polyester engineering plastics are low molecular weight organic esters such as neopentylglycoldibenzoate (Benzoflex S312) and dipropyleneglycoldienzoate (Benzoflex 9-88). Alternate plasticizers are poly(ether esters) such as copolyesters of poly(butylene terephthalate) and poly(tetramethylene glycol) (Hytrel).

Another key requirement when processing polyesters is drying. It is important to minimize or eliminate moisture from a polyester prior to melt processing, otherwise hydrolytic degradation occurs resulting in a diminished molecular weight and unacceptable mechanical properties. Furthermore, because drying results in an increased processing cost it is important to minimize the drying time required. Thus it is an advantage to dry at higher temperatures as this reduces the time necessary. However, many of the plasticizers and flow aids used in the art are volatile under drying conditions. Volatile emissions are undesirable because they contaminate the dryers and increase cleaning and maintenance costs.

Low molecular weight organic esters are known plasticizers for polyesters, but they tend to be volatile in the dryers, which can be remedied only by lowering drying temperatures and increasing drying time. Increasing the molecular weight of organic esters is known to reduce volatility during drying, however it is taught that this approach is not effective because the higher molecular organic esters are no longer plasticizers.

Low volatility has previously been considered advantageous because it allows higher temperatures and shorter times for melt processing. Poly(alkylene ether)s have been reported to be such non-volatile processing aids for polyesters. Suprisingly, however, many of these non-volatile poly (alkylene ether)s are volatile during the drying process over the relatively long times required for drying. This volatility results in contaminated dryers and loss of productivity.

SUMMARY OF THE INVENTION

This invention pertains to the use of a specified molecular weight range of poly(alkylene ether)s, such as poly(ethylene glycol) (PEG), poly(tetramethylene glycol) (PTMG), and poly(propylene glycol) (PPG), and end-capped poly (alkylene ether)s, as plasticizers for polyesters such as poly(ethylene terephthalate) (PET), poly(propylene terephthalate) (PPT), poly(butylene terephthalate) (PEBT), poly(ethylene naphthalate) (PEN), and poly(1,4-cyclohexanedimethylene terephthalate) (PCT), that are non-volatile during drying processes as well as during melt processing. Such poly(alkylene ether)s and end-capped poly (alkylene ether)s decrease the melt viscosity of the polymer matrix and depress the glass transition temperature, and thereby improve the processability of polyesters.

Thus, in accordance with the purpose(s) of this invention, as embodied and broadly described herein, this invention, in one aspect, relates to a blend comprising:

a. from about 1 to about 25 weight pphr of a poly(alkylene ether) having the formula (I):

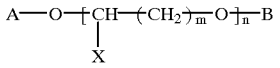

wherein:

i. m is an integer of from 1 to 3;

ii. n is an integer of from 5 to 140;

iii. X is selected from hydrogen, hydrocarbon, and amide of 10 carbons or less;

iv. A and B are independently selected from alkyl, acyl, or an aryl residue, of 1 to 200 carbons;

v. the poly(alkylene ether) has a number average molecular weight of from about 800 to about 6000; and b. a polyester resin selected from modified and unmodified poly(ethylene terephthalate), poly(propylene terephthalate), poly(butylene terephthalate), poly(ethylene naphthalate), and poly(1,4-cyclohexanedinethylene terephthalate), wherein:

i. the polyester is semicrystalline; and ii. the polyester has a melting point greater than 200° C.

In another embodiment the invention provides a blend comprising:

a. from about 1 to about 25 weight pphr of a poly(alkylene ether) having the formula (I) wherein:

i. m is 1;

ii. n is an integer of from 10 to 25;

iii. X is selected from hydrogen, methyl, ethyl, and propyl;

iv. A and B are independently selected from alkyl, acyl, or an aryl residue, of 1 to 200 carbons;

v. the number average molecular weight of A and B summed is greater than about 250; and vi. the poly(alkylene ether) has a number average molecular weight of from about 800 to about 6000; and b. a polyester resin selected from modified and unmodified poly(ethylene terephthalate), poly(propylene terephthalate), poly(butylene terephthalate), poly(ethylene naphthalate), and poly(1,4-cyclohexanedimethylene terephthalate), wherein:

i. the polyester is semicrystalline; and ii. the polyester has a melting point greater than 240° C.

In another embodiment the invention provides a process for making a composition comprising melt mixing a blend comprising:

a. from about 1 to about 25 weight pphr of a poly(alkylene ether) having the formula (I) wherein:

i. m is an integer of from 1 to 3;

ii. n is an integer of from 5 to 140;

iii. X is selected from hydrogen, hydrocarbon, and amide of 10 carbons or less;

iv. A and B are independently selected from alkyl, acyl, or an aryl residue, of 1 to 200 carbons;

v. the poly(alkylene ether) has a number average molecular weight of from about 800 to about 6000; and b. a polyester resin selected from modified and unmodified poly(ethylene terephthalate), poly(propylene terephthalate), poly(butylene terephthalate), poly(ethylene naphthalate), and poly(1,4-cyclohexanedimethylene terephthalate), wherein:

i. the polyester is semicrystalline; and ii. the polyester has a melting point greater than 200° C.; wherein the melt mixing is performed under sufficiently mild conditions to avoid reaction between the polyester and the poly(alkylene ether).

In still another embodiment the invention provides a process for making a composition comprising melt mixing a blend comprising:

a. from about 1 to about 25 weight pphr of a poly(alkylene ether) having the formula (I) wherein:

i. m is 1;

ii. n is an integer of from 10 to 25;

iii. X is selected from hydrogen, methyl, ethyl, and propyl;

iv. A and B are independently selected from alkyl, acyl, or an aryl residue, of 1 to 200 carbons;

v. the number average molecular weight of A and B summed is greater than about 250; and vi. the poly(alkylene ether) has a number average molecular weight of from about 800 to about 6000; and b. a polyester resin selected from modified and unmodified poly(ethylene terephthalate), poly(propylene terepthalate), poly(butylene terephthalate), poly(ethylene naphthalate), and poly(1,4-cyclohexanedimethylene terephthalate), wherein:

i. the polyester is semicrystalline; and ii. the polyester has a melting point greater than 240° C. wherein the melt mixing is performed under sufficiently mild conditions to avoid reaction between the polyester and the poly(alkylene ether)

In still another embodiment the invention provides a method of using polyester blends to reduce volatile emissions during drying, comprising providing a polyester blend of this invention, and drying the polyester blend at greater than 100° C. In a still further embodiment the invention provides a method of using polyester blends to reduce volatile emissions during molding, comprising providing a polyester blend of this invention, and molding the polyester blend into a useful article.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DISCUSSION

The present invention may be understood more readily by reference to the following detailed description of preferred embodiments of the invention and the Examples included therein.

Before the present compounds, compositions and methods are disclosed and described, it is to be understood that this invention is not limited to specific methods or compositions, as such may, of course, vary. It is also to be understood that the terminology used herein is for the purpose of describing particular embodiments only and is not intended to be limiting.

Use of Terms

It must be noted that, as used in the specification and the appended claims, the singular forms "a," "an" and "the" include plural referents unless the context clearly dictates otherwise. Thus, for example, reference to "a polyester" includes mixtures of polyesters, reference to "a poly (alkylene ether)" includes mixtures of two or more such poly(alkylene ether)s, and the like.

Ranges are often expressed herein as from "about" one particular value, and/or to "about" another particular value. When such a range is expressed, another embodiment includes from the one particular value and/or to the other particular value. Still another embodiment includes from the one particular value and/or to the other particular value, but not including the particular value(s). Similarly, when values are expressed as approximations, by use of the antecedent "about", it will be understood that the particular value forms another embodiment.

Definitions

In this specification and in the claims which follow, reference will be made to a number of terms which shall be defined to have the following meanings:

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

The term "alkyl" as used herein refers to a branched or unbranched, aliphatic or cyclic, saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 12 carbon atoms. The term "lower alkyl" intends an alkyl group of from one to six carbon atoms, preferably from one to four carbon atoms. The term "cycloalkyl," intends a cyclic alkyl group of from three to eight, preferably five or six carbon atoms.

The term "acyl" means any group having the formula RC═O, wherein R is aryl or alkyl. Examples include acetyl, propanoyl, and benzoyl.

The term "aryl" means any unsaturated cyclic group of from three to six carbon atoms or heteroatoms. Examples include benzyl and pyridinyl.

"PPHR" means parts per 100 parts resin, and is used to express the relative parts by weight of an ingredient in a resinous blend or composition. Thus, in a composition that contains 5 pphr of ingredient A, there is present 5 weight parts ingredient A, and 100 weight parts of resin.

"Fatty acid" means a long chain carboxylic acid, and can typically be represented by the formula $CH_3(CH_2)_nC(O)OH$, wherein n is from about 8 to about 20. Preferred fatty acids are unsaturated, and include lauric acid, myristic acid, palmitic acid, and stearic acid, with lauric acid being most preferred.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The term "modified" is often used herein to describe polymers and means that a particular monomeric unit that would typically make up the pure polymer has been replaced by another monomeric unit that shares a common polymerization capacity with the replaced monomeric unit. Thus, for example, it is possible to substitute diol residues for glycol in poly(ethylene glycol), in which case the poly(ethylene glycol) will be "modified" with the diol. If the poly(ethylene glycol) is modified with a mole percentage of the diol, then such a mole percentage is based upon the total number of moles of glycol that would be present in the pure polymer but for the modification. Thus, in a poly(ethylene glycol) that has been modified by 50 mole % with a diol, the diol and glycol residues are present in equimolar amounts.

The term "polyester" includes copolyesters.

In accordance with the purpose(s) of this invention, as embodied and broadly described herein, this invention, in one aspect, relates to a blend comprising:

a. from about 1 to about 25 weight pphr of a poly(alkylene ether) having the formula (I):

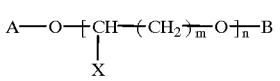

wherein:

i. m is an integer of from 1 to 3, preferably 1;

ii. n is an integer of from 5 to 140, preferably 5 to 10 to 25;

iii. X is selected from hydrogen, hydrocarbon, and amide of 10 carbons or less, preferably hydrogen, methyl, ethyl, or propyl, most preferably hydrogen;

iv. A and B are independently selected from alkyl, acyl, or an aryl residue, of 1 to 200 carbons, and are preferably independently the residue of one or more fatty acids having from about 10 to about 20 carbons;

v. optionally, the number average molecular weight of A and B summed is preferably greater than about 250, even more preferably greater than about 350; and vi. the poly(alkylene ether) has a number average molecular weight of from about 800 to about 6000, preferably from about 900 to about 2500, and more preferably from about 900 to about 1600; and b. a polyester resin selected from modified and unmodified poly(ethylene terephthalate), poly(propylene terephthalate), poly(butylene terephthalate), poly(ethylene naphthalate), and poly(1,4-cyclohexanedimethylene terephthalate), wherein:

i. the polyester is semicrystalline; and ii. the polyester has a melting point greater than 200° C., preferably greater than 240° C., and even more preferably greater than 260° C.

Several ranges and values are given for some of the variables recited above, and it will be understood that the invention encompasses all combinations of the variables. Thus, in another embodiment the invention provides a blend comprising:

a. from about i to about 25 weight pphr of a poly(alkylene ether) having the formula (I) wherein:

i. m is 1;

ii. n is an integer of from 10 to 25;

iii. X is selected from hydrogen, methyl, ethyl, and propyl, preferably hydrogen;

iv. A and B are independently selected from alkyl, acyl, or an aryl residue, of 1 to 200 carbons, and are preferably independently fatty acid residues comprising having from about 10 to about 20 carbons;

v. the number average molecular weight of A and B summed is greater than about 250; and vi. the poly(alkylene ether) has a number average molecular weight of from about 800 to about 6000, preferably from about 900 to about 2500, and even more preferably from about 900 to about 1600; and b. a polyester resin selected from modified and unmodified poly(ethylene terephthalate), poly(propylene terephthalate), poly(butylene terephthalate), poly(ethylene naphthalate), and poly(1,4-cyclohexanedimethylene terephthalate), wherein:

i. the polyester is semicrystalline; and ii. the polyester has a melting point greater than 240° C.

In a particularly preferred embodiment the polyester is poly(ethylene terephthalate) having a melting temperature greater than about 240° C. In another particularly preferred embodiment the polyester is poly(1,4-cyclohexanedimethylene terephthalate) having a melting temperature greater than about 260° C.

In still another embodiment the blend comprises a phosphorous compound, such as a phosphite, phosphate, or phosphonate. These phosphorous containing compounds deactivate any catalyst remaining in the blend, to inhibit or prevent further reaction of the polyester and/or poly (alkylene ether) during processing of the blend. In a particularly preferred embodiment the blend comprises a phosphorous compound, and the polyester is poly(1,4-cyclohexanedimethylene terephthalate) having a melting temperature greater than about 260° C.

In one particular blend:

a. X is hydrogen;

b. A and B are independently the residue of one or more fatty acids having from about 10 to about 20 carbons;

c. the poly(alkylene ether) has a number average molecular weight of from about 900 to about 1600;

d. the polyester is poly(1,4-cyclohexanedimethylene terephthalate) having a melting temperature greater than about 260° C.;

e. the blend further comprises a phosphorous compound; and f. the blend further comprises from about 30 to about 100 pphr of glass fiber.

The poly(alkylene ether)s and end-capped poly(alkylene ether)s of the present invention decrease the melt viscosity of the polymer matrix and depress the glass transition temperature, thereby improving the processability of polyesters.

The poly(alkylene ether)s or end-capped poly(alkylene ether)s are preferably limited by molecular weight. Poly (alkylene ether)s with molecular weights below the recited ranges tend to be volatile during drying whereas poly (alkylene ether)s with a molecular weight above the recited ranges tend to phase separate from the polyester and be ineffective plasticizers.

It was unexpected that poly(alkylene ether)s in this molecular weight range would be effective plasticizers because the prior art stresses the importance of low molecular weight organic compounds, desired carbon atom to ester bond ratios, branching, or aromatic functionality to provide compatibility with the matrix resin. The prior art teaches that without this compatibility the additives are ineffective processing aids. Furthermore, although the prior art teaches the importance of low molecular weight, it has been suprisingly discovered that higher molecular weights are not only acceptable, but desired. Higher molecular weight poly (alkylene ether)s and end-capped poly(alkylene ether)s (within the preferred range), remain compatible with the distinct advantage of being less volatile during drying.

Preferred poly(alkylene ether)s include poly(ethylene glycol), poly(tetramethylene glycol), poly(propylene glycol), and mixtures thereof. These poly(alkylene glycol)s can either be end-capped or not. In one embodiment the poly(alkylene ether) is end-capped by reacting the terminal hydroxyl groups with epoxy, ether, or carboxylic acid compounds. For example if the poly(alkylene ether) is end-capped with a carboxylic acid compound (preferably a fatty acid) then an organic ester functionality would be obtained. End-capped poly(alkylene ether)s, such as the organic esters of poly(alkylene ether)s, are preferred because they improve the thermal stability of the poly(alkylene ether). However, the organic ester is not critical to compatibility or plasticization of the polyester.

Endcapping serves the beneficial role of reducing the likelihood of reaction between the polyester and poly (alkylene ether). This role is important to preserve the semicrystalline character of the polyester blend. Thus, the poly(alkylene ether) is preferably endcapped on at least one end, and more preferably on both. Other ways to reduce the likelihood of reaction include addition of a catalyst deactivating agent (such as a phosphorous compound), and processing the blend under mild conditions.

Other additives, such as glass fiber, carbon fiber, reinforcing agents, coupling agents, stabilizers, flame retardants, tougheners, epoxy compounds, mold release agents, nucleating agents, and colorants, can also be present in the compositions of this invention, but are not necessary. Such additives are generally present at 0.1 to about 45 weight % based on the total weight of the polyester composition. Each additive may be present at such a level, and collectively the total concentration of additives may be higher. In one embodiment the blend comprises from about 10 to about 200 pphr of reinforcing additives and/or from about 30 to about 100 pphr of glass fibers.

The acid component of the polyester can be modified, preferably up to 20%, more preferably only up to 10%, and still even more preferably only up to 5%. Dicarboxylic acids useful for such modification include, but are not limited to, aromatic dicarboxylic acids preferably having 8 to 14 carbon atoms, aliphatic dicarboxylic acids preferably having 4 to 12 carbon atoms, and cycloaliphatic dicarboxylic acids preferably having 8 to 12 carbon atoms.

Particularly preferred examples of dicarboxylic acids other than terephthalic acid to be used in forming the copolyester of the invention include: isophthalic acid, naphthalene- 2,6-dicarboxylic acid, 1,4-cyclohexanedicarboxylic acid, 1,4-cyclohexanediacetic acid, diphenyl-4,4'-dicarboxylic acid, succinic acid, glutaric acid, adipic acid, azelaic acid, sebacic acid, and the like. Of these dicarboxylic acids to be included with terephthalic acid, isophthalic acid is preferred. Copolyesters may be prepared from one or more of the above dicarboxylic acids.

It should be understood that the dicarboxylic acid can arise from the corresponding acid anhydrides, esters, and acid chlorides of these acids.

The glycol component of the polyester may also be modified, with up to 20 mole %, preferably up to 10 mole %, and more preferably up to 5 mole %, of one or more other aliphatic or alicyclic glycols. Such additional diols include cycloaliphatic diols preferably having 6 to 20 carbon atoms or aliphatic diols preferably having 2 to 20 carbon atoms. Examples of such diols are: ethylene glycol, diethylene glycol, triethylene glycol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)propane, 2,4-dihydroxy-1,1,3,3-tetramethyl-cyclobutane, 2,2-bis-(3-hydroxyethoxyphenyl)-propane, decalin diol and 2,2-bis-(4-hydroxypropoxyphenyl)-propane.

Copolyesters may be prepared from two or more of the above diols. Ethylene glycol is a preferred glycol.

The copolyester resins useful in the blends of this invention are well known and are commercially available. Methods for their preparation are described, for example, in U.S. Pat. Nos. 2,465,319 and 3,047,539.

The polyesters of the invention preferably have an inherent viscosity of 0.1 to 1.2 dL/g, more preferably 0.1 to 0.9 dL/g, and even more preferably, 0.4 to 0.8 dLg. The inherent viscosities (I.V.) of the copolyesters are determined in 60/40 (wt./wt.) phenol/tetrachloroethane at a concentration of 0.5 g/100 ml as determined at 25° C.

Copolyesters containing substantially only ethylene glycol, 1,4-cyclohexanedimethanol and terephthalic acid or substantially only ethylene glycol, 1,4-cyclohexanedimethanol, isophthalic and terephthalic acid are preferred in one embodiment.

Examples of reinforcing agents are glass fibers, carbon fibers, mica, clay, talc, wollastonite, and calcium carbonate. A particularly preferred reinforcing agent is glass fiber. It is preferable that the glass fibers be present in the polyester composition at from 1 to 60%, preferably 10 to 40%, by weight based on the total weight of said polyester composition.

Glass fibers suitable for use in the polyester compositions of the invention may be in the form of glass filaments, threads, fibers, or whiskers, etc., and may vary in length from about ⅛ inch to about 2 inches. Chopped glass strands having a length of about ⅛ inch to about ¼ inch are preferred. Such glass fibers are well known in the art. Of course, the size of these glass fibers may be greatly diminished depending on the blending means employed, even to lengths of 300 to 700 microns or lower.

The polyester compositions of the invention may be reinforced with a mixture of glass and other reinforcing agents as described above, such as mica or talc, and/or with other additives.

The polyester compositions of the invention containing reinforcing agents may be molded at mold temperatures below 120° C. and are therefore easily molded without the need for expensive mold heating equipment. The preferred molding temperature of the glass filled polyester compositions of the invention is in the range of 20 to 110° C.

The components of the blend of the invention may be blended and/or mixed by any suitable technology known in the art. Thus, in another embodiment the invention provides a process for making a composition comprising melt mixing a blend comprising:

a. from about 1 to about 25 weight pphr of a poly(alkylene ether) having the formula (I) wherein:

i. m is an integer of from 1 to 3;

ii. n is an integer of from 5 to 140;

iii. X is selected from hydrogen, hydrocarbon, and amide of 10 carbons or less;

iv. A and B are independently selected from alkyl, acyl, or an aryl residue, of 1 to 200 carbons;

v. the poly(alkylene ether) has a number average molecular weight of from about 800 to about 6000; and b. a polyester resin selected from modified and unmodified poly(ethylene terephthalate), poly(propylene terephthalate), poly(butylene terephthalate), poly(ethylene naphthalate), and poly(1,4-cyclohexanedimethylene terephthalate), wherein:

i. the polyester comprises 100 mol parts acid residue, and 100 mol parts diol residue;

ii. the polyester is semicrystallne; and iii. the polyester has a melting point greater than 200° C.; wherein the melt mixing is performed under sufficiently mild conditions to avoid reaction between the polyester and the poly(alkylene ether).

A skilled worker will appreciate that the reaction conditions can be adjusted, based upon the composition employed, to avoid reaction between the polyester and poly(alkylene ether), by for example reducing the mixing time or temperature. Similarly, the composition can contain additives or the poly(alkylene ether)s can be endcapped, to reduce the likelihood of reaction.

In still another embodiment the invention provides a process for making a composition comprising melt mixing a blend comprising:

a. from about 1 to about 25 weight pphr of a poly(alkylene ether) having the formula (I) wherein:

i. m is 1;

ii. n is an integer of from 10 to 25;

iii. X is selected from hydrogen, methyl, ethyl, and propyl;

iv. A and B are independently selected from alkyl, acyl, or an aryl residue, of 1 to 200 carbons;

v. the number average molecular weight of A and B summed is greater than about 250; and vi. the poly(alkylene ether) has a number average molecular weight of from about 800 to about 6000; and b. a polyester resin selected from modified and unmodified poly(ethylene terephthalate), poly(propylene terephthalate), poly(butylene terephthalate), poly(ethylene naphthalate), and poly(1,4-cyclohexanedimethylene terephthalate), wherein:

i. the polyester is semicrystalline; and ii. the polyester has a melting point greater than 240° C. wherein the melt mixing is performed under sufficiently mild conditions to avoid reaction between the polyester and the poly(alkylene ether).

In still another embodiment the invention provides a method of using polyester blends to reduce volatile emissions during drying, comprising providing the polyester blend recited above, and drying the polyester blend at greater than 100° C. In a still further embodiment the invention provides a method of using polyester blends to reduce volatile emissions during molding, comprising providing the polyester blend recited above, and molding the polyester blend into a useful article. In a preferred embodiment, one is able to process greater than 1,000 lbs/day of polyester, without a plasticizer trap to capture volatile emissions, and with aftercoolers only, without fouling of the aftercoolers.

Molded objects and films may be prepared from the polyester compositions of the invention including any preferred embodiment.

EXAMPLES

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at room temperature, and pressure is at or near atmospheric.

The compositions reported in the following examples were prepared using either poly(1,4-cyclohexanedimethylene terephthalate) (PCT) or poly (ethylene terephthalate) (PET) having inherent viscosities in the range of 0.5 to 1.00 dL/g as determined at 25° C. using 0.5 gram of polymer per 100 mL of a solvent composed of 60 wt % phenol and 40 wt % tetrachloroethane. The abbreviations "PCT" and "PET" in these examples refer to poly(1,4-cyclohexanedimethylene terephthalate) and poly (ethylene terephthalate) respectively. Benzoflex 312 is the commercial name for neopentylglycoldibenzoate and Benzoflex 552 is pentaerythritoltetrabenzoate. The abbreviations "DEH", "DU", "DO", and "DS" refer to di-ethylhexanoate, di-laurate, di-oleate, and di-stearate respectively.

The compositions were prepared by mixing the desired components on a twin screw extruder, extruded into a cold water bath and pelletized. All compositions are reported on a weight percent basis. Thermal analysis (DSC) and thermal gravimetric analysis (TGA) were performed on the compounded pellets. Volatility during drying was determined by drying the samples in a desiccant drier at 120° C. for 4 to 16 hours. The appearance of condensed volatiles in the aftercooler indicated volatility during drying.

The effectiveness of the plasticizer on increasing the crystallization rate as well as lowering the optimum temperature for crystallization was determined by evaluating the temperature of crystallization on heating (Tch) by DSC with a scan rate of 20° C. per minute after quenching from the melt. An effective plasticizer will lower Tch. Therefore, the lower the Tch value, the better the plasticizing effect.

Example 1 is a comparative PCT control utilizing no plasticizer. As can be seen from example 1, PCT has a Tch of 133° C., a 0.5% weight loss temperature of 279° C. and has no volatility during drying. Example 2 is a comparative example utilizing 3.8% Benzoflex 312, a common plasticizer for polyesters. As can be seen in example 2 this plasticizer lowers the Tch of PCT to 114° C. The low 0.5% weight loss temperature indicates potential volatility during compounding and molding and this plasticizer is volatile during drying.

Example 3 is also a comparative example, and utilizes a higher molecular weight organic ester, similar to Benzoflex 312, as the plasticizer. As taught in the prior art, increasing the molecular weight of the organic ester results in a less effective plasticizer for PCT as indicated by its significantly higher Tch for example 3 when compared to example 2. This organic ester is not volatile during drying or compounding, however it is still not desirable because it is not a good plasticizer. Example 4 is a higher molecular weight organic ester from a poly(alkylene ether). This poly(alkylene ether) has been previously demonstrated to be non-volatile during compounding and it is an effective plasticizer, however it is volatile during drying.

Examples 5–12 are examples of this invention. These examples are made from higher molecular weight poly (alkylene ether)s with and without end-capping. These examples are effective plasticizers and are also non-volatile during drying and melt processing.

Examples 13–19 are all based on PET. Example 13 is a comparative example utilizing non-plasticized PET, and shows a high Tch of 156° C., and no volatility during drying. Examples 14 and 15 are comparative examples utilizing effective plasticizers, but both plasticizers are volatile during drying. Examples 16–19 are examples of this invention. These examples use higher molecular weight poly(alkylene ether)s with and without end-capping. These examples are effective plasticizers and are also non-volatile during drying and melt processing.

TABLE 1

Volatility of Poly(alkylene ether)/Polyester blends

| | Polyester | Poly(alkylene ether) | Wt % | Molecular Weight (g/mole) | Number of Repeat Units | C atom/ Ester | Tg | Tch | .5% Weight Loss | Volatile During Drying |
|---|---|---|---|---|---|---|---|---|---|---|
| 1 | PCT | None | 0 | N/A | N/A | N/A | 89 | 133 | 279 | No |
| 2 | PCT | Benzoflex 312 | 3.8 | 312 | N/A | 9.5 | 72 | 114 | 200 | Yes |
| 3 | PCT | Benzoflex 552 | 3.8 | 552 | N/A | 8.25 | 80 | 124 | 275 | No |
| 4 | PCT | PEG-400-DEH | 3.8 | 728 | 10 | 18 | 53 | 100 | 236 | Yes |
| 5 | PCT | PEG-600-DEH | 3.8 | 948 | 15 | 23 | 55 | 90 | 242 | No |
| 6 | PCT | PEG-1000-DEH | 3.8 | 1288 | 23 | 31 | 56 | 92 | 270 | No |
| 7 | PCT | PEG-600-DL | 3.8 | 1060 | 15 | 27 | 40 | 86 | 270 | No |
| 8 | PCT | PEG-600-DO | 3.8 | 1225 | 15 | 33 | 54 | 90 | 272 | No |
| 9 | PCT | PEG-6000-DS | 3.8 | 6569 | 136 | 154 | 86 | 133 | 275 | No |
| 10 | PCT | PEG-400-DS | 3.8 | 1009 | 10 | 28 | 68 | 101 | 293 | No |
| 11 | PCT | PEG-600-DO | 3.8 | 1225 | 15 | 33 | 69 | 105 | 303 | No |
| 12 | PCT | PTMG-1000 | 5.0 | 1000 | 14 | N/A | 64 | 100 | 280 | No |
| 13 | PET | None | 0 | N/A | N/A | N/A | 80 | 156 | | No |
| 14 | PET | Benzoflex 312 | 3.5 | N/A | N/A | 9.5 | | | | Yes |
| 15 | PET | PEG-400-DEH | 3.5 | 728 | 10 | 18 | 61 | 113 | 230 | Yes |
| 16 | PET | PEG-600-DL | 3.5 | 1060 | 15 | 27 | 63 | 114 | 269 | No |
| 17 | PET | PTMG-1000 | 3.5 | 1000 | 14 | N/A | | | | No |
| 18 | PET | PEG-1000-DEH | 3.5 | 1288 | 23 | 31 | 65 | 119 | | No |
| 19 | PET | PEG-1000-DS | 3.5 | 1569 | 23 | 41 | 66 | 119 | | No |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for reducing volatile emissions from polyester blends during drying comprising:

a. providing a blend having:

i. from about 1 to about 25 weight pphr of a poly (alkylene ether) having a number average molecular weight of from about 800 to about 6000 and represented by the formula:

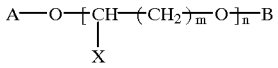

wherein:

m is an integer of from 1 to 3;

n is an integer of from 5 to 140;

X is selected from the group consisting of hydrogen, hydrocarbon, and amide having 10 carbons or less;

A and B are independently selected from the group consisting of alkyl, acyl, and aryl residues having from 1 to 200 carbon atoms; and ii. a semi-crystalline polyester resin having melting point greater than 200° C. selected from the group consisting of poly(ethylene terephthalate), poly (propylene terephthalate), poly(butylene terephthalate), poly(ethylene naphthalate), and poly (1,4-cyclohexanedimethylene terephthalate); and b. drying said polyester blend at a temperature greater than 100° C.

2. The method of claim 1 wherein m is 1.

3. The method of claim 1 wherein n is from about 10 to about 25.

4. The method of claim 1 wherein X is selected from the group consisting of hydrogen, methyl, ethyl, and propyl.

5. The method of claim 1 wherein X is hydrogen.

6. The method of claim 1 wherein the number average molecular weight of A and B summed is greater than about 250.

7. The method of claim 1 wherein A and B are independently the residue of one or more fatty acids having from 10 to 20 carbon atoms.

8. The method of claim 1 wherein said polyester is poly(ethylene terephthalate).

9. The method of claim 1 wherein said polyester is poly(1,4-cyclohexanedimethylene terephthalate).

10. The method of claim 1 wherein said blend further includes a phosphorous compound.

11. The method of claim 1 wherein said blend further includes from about 10 to about 200 pphr of reinforcing additives.

12. The method of claim 1 further comprising molding the polyester blend into a useful article.

13. A method for reducing volatile emissions from polyester blends during drying comprising:

a. providing a blend having:

i. from about 1 to about 25 weight pphr of a poly (alkylene ether) having a number average molecular weight of from about 900 to about 1600 and represented by the formula:

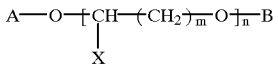

wherein:

m is 1;

n is an integer of from 10 to 25;

X is selected from the group consisting of hydrogen, methyl, ethyl, and propyl;

A and B are independently selected from the group consisting of residues of one or more fatty acids having from 10 to 20 carbon atoms and wherein the number average molecular weight of A and B summed is greater than about 250; and ii. a semi-crystalline polyester resin having melting point greater than 200° C. selected from the group consisting of poly(ethylene terephthalate), and poly (1,4-cyclohexanedimethylene terephthalate); and b. drying said polyester blend at a temperature greater than 100° C.

14. The method of claim 13 wherein X is hydrogen.

15. The method of claim 13 further comprising molding the polyester blend into a useful article.

* * * * *